United States Patent
Harmel et al.

(10) Patent No.: US 8,090,820 B2
(45) Date of Patent: Jan. 3, 2012

(54) DISTRIBUTED TRAFFIC ANALYSIS

(75) Inventors: Gautier Harmel, Paris (FR); Eric Horlait, Amiens (FR); Jerome Tollet, Paris (FR)

(73) Assignee: QOSMOS, Amiens (FR)

( * ) Notice: Subject to any disclaimer, the term of this patent is extended or adjusted under 35 U.S.C. 154(b) by 393 days.

(21) Appl. No.: 11/914,047

(22) PCT Filed: May 12, 2006

(86) PCT No.: PCT/EP2006/005328
§ 371 (c)(1),
(2), (4) Date: Mar. 6, 2008

(87) PCT Pub. No.: WO02/17036
PCT Pub. Date: Feb. 28, 2002

(65) Prior Publication Data
US 2008/0195731 A1    Aug. 14, 2008

(30) Foreign Application Priority Data
May 13, 2005  (EP) .................................. 05291043

(51) Int. Cl.
*G06F 15/173* (2006.01)
(52) U.S. Cl. ........ 709/224; 709/225; 709/235; 713/153; 713/154
(58) Field of Classification Search .................. 709/224, 709/223, 225, 229, 235; 713/53–54
See application file for complete search history.

(56) References Cited

U.S. PATENT DOCUMENTS

| | | | | |
|---|---|---|---|---|
| 6,285,748 | B1 * | 9/2001 | Lewis | 379/112.01 |
| 7,043,544 | B2 * | 5/2006 | Baker et al. | 709/223 |
| 7,496,661 | B1 * | 2/2009 | Morford et al. | 709/224 |
| 7,508,764 | B2 * | 3/2009 | Back et al. | 370/235 |
| 2002/0035628 | A1 * | 3/2002 | Gil et al. | 709/224 |
| 2003/0120790 | A1 * | 6/2003 | Baker et al. | 709/230 |
| 2003/0145232 | A1 * | 7/2003 | Poletto et al. | 713/201 |
| 2004/0008627 | A1 | 1/2004 | Garg et al. | |
| 2005/0053074 | A1 * | 3/2005 | Wybenga et al. | 370/395.43 |
| 2005/0071445 | A1 | 3/2005 | Siorek et al. | |
| 2005/0083935 | A1 * | 4/2005 | Kounavis et al. | 370/392 |
| 2006/0193344 | A1 | 8/2006 | Nie et al. | |
| 2007/0058632 | A1 * | 3/2007 | Back et al. | 370/392 |

FOREIGN PATENT DOCUMENTS

| | | |
|---|---|---|
| CN | 1612527 | 5/2005 |
| EP | 1 117 211 A2 | 7/2001 |
| EP | 1117211 | 7/2001 |
| WO | 02/17036 A2 | 2/2002 |
| WO | WO 02/17036 | 2/2002 |

* cited by examiner

*Primary Examiner* — William C. Vaughn, Jr.
*Assistant Examiner* — Mohamed Ibrahim
(74) *Attorney, Agent, or Firm* — Occhiuti Rohlicek & Tsao LLP

(57) ABSTRACT

A distributed system for analyzing traffic flow on a communications network architecture where a computer provides information over a data network to a concentrator, which provides a bridge between the computer and the end user terminals. The interface between the terminals and the concentrator is provided through access points for each workstation. The system to analyze the traffic is distributed into three components that perform, respectively, classification of the traffic flow, processing of the results of the classification, and handling of the processed results.

17 Claims, 2 Drawing Sheets

DISTRIBUTED TRAFFIC ANALYSIS

CROSS-REFERENCE TO RELATED APPLICATIONS

This application is the National Stage of International Application No. PCT/EP2006/005328, filed on May 12, 2006, which claims the benefit of European Application No. 05291043.7, filed on May 13, 2005. The contents of both applications are hereby incorporated by reference in their entirety.

TECHNICAL FIELD

The present invention relates to the analysis of data traffic over various types of data networks, and in particular, those found on DSL, cables, or FTTH (Fiber to the Home or Fiber to the Premises) communication transmissions, mobile telephone networks (GSM, CDMA, UMTS, etc) and WiFi or WiMax networks, among others.

BACKGROUND

In analyzing traffic flow over data networks, for various reasons, such as billing, security, QoS (Quality of Service), usage data, and the like, it is essential to have clear and precise information concerning the traffic classification in a digital communication network (e.g., Internet) transmitted between a source computer (servers, routers, personal computers, etc.) and a destination computer (end user terminals, terminals, servers, routers, etc).

Investigating traffic flow can take a lot of processing time and power to monitor and classify, and both the amount and speed of traffic data, especially Internet traffic data, are ferociously increasing. Systems for traffic flow analysis very often encounter several obstacles, which take place at the level of the traffic flow passage due to various types of heavy processing required in order to obtain a semantic, reliable, and useful classification and processing of network traffic.

Classification of traffic travelling around a communications network makes it possible to decide on behaviours to be adopted for each traffic flow as a function of its classification. That is, before a data packet can be adequately processed, classification of the traffic flow permits the network components to classify the data packets according to the various characteristics of the packets and information contained in the packet. Thus, accurate and efficient data processing depends largely on reliable methods of packet classification. After the packet is classified, the network components can determine how to properly handle and process the packets.

For example, in a firewall, a security system setup generally relies on recognition of protocol properties to prevent certain transfers, and in devices for managing quality of service, such devices allocate priorities to data as a function of complex rules which describe various scenarios. A correspondence between these scenarios and data packets conveyed within connections uses techniques for classifying these connections.

Furthermore, analysis and classification of packets often involve the complex task of constructing protocol attributes, i.e., determining the ordered sequence of protocol names used in the semantic stream of data and the parameter names carried by a protocol. Building such a graph or knowledge base to recognize different protocols is a very heavy task because of the increasing numbers of new protocols used in packet communication networks, as well as the number of protocol modifications and new dependency links.

Generally, the analysis of traffic flow on such networks is supported by inserting traffic analyzers at specific locations of the communication link. That is, a data packet observation task is assigned to a node of the network such as, for example, a proxy server where connections pass through, which generate these data packets. Thus, existing traffic flow analyses can be performed in computer networked systems where generally, a communication link connects (1) terminals running applications and processing user requests; (2) access points interfacing the workstation and the network, which are commonly modems associated to processing entities of the type "set top box"; (3) a concentrator, which collects the access link of a number of users; (4) a transmission network for providing the data transfer service; and (5) a server providing the data to the users. An additional problem is that if traffic is encrypted, packet inspection will be impossible unless classification of the packets by the access points occur prior to any of the encryption steps.

This type of architecture or framework is used in popular transmission systems such as DSL, cable, or FTTH. Other existing transmission networks can include similar types of architectures such as mobile network systems.

These locations can be chosen to be representative of the global traffic in the network. However, in addition to posing accuracy and efficiency issues, this approach requires a system with increasing processing power to support the incessant increase of traffic. In other words, processing power cannot be adjusted based on the requirements for a single user or workstation because network configurations having analyzers require a large and inefficient amount of processing power. Moreover, the treatment of traffic encryption must be addressed.

Therefore, it would be desirable to implement a new method and system to address the inaccuracy of measurements and efficiency problems by distributing the function of the analyzer between several components located in a distributed traffic analysis system. This would address the processing power issues by distributing the analysis function over several components, which would improve the quality of traffic analysis regardless of the transmission speed, and provide a flexible and extensible system and method to record accurate network performance and behaviour.

SUMMARY OF THE INVENTION

Accordingly, it is an object of the invention to provide an improved distributed traffic analysis system and method for analyzing traffic in a communication system having access points interfacing between terminals and a concentrator for each of the terminals. The distributed traffic analysis system includes embedded classification components hosted in at least some of the access points, performing classification and analysis of network traffic, a management server configured to process results of the classification sent by the embedded classification components, and at least one network operating system adapted to use the classified information pertaining to the classification of the traffic processed by the management server to generate a comprehensive analysis of the traffic.

One or more of the following features may also be included.

In one aspect of the invention, the system also includes a communication protocol managed by the embedded classification components for providing a communication means between the embedded classification components and the management server.

Further, the communication protocol is configured to encapsulate the information within the traffic flow, by modifying the content of the packets intended to carry optional information, as well as to use a proprietary and/or standardized signalling between the embedded classification components and the management server.

In yet another aspect, the management server is configured to process the classified information pertaining to the classification of the traffic flow by consolidating and storing the classified traffic, as well as by counting the classified traffic, or by establishing statistical information.

Moreover, the system also includes a hierarchical analyzing system with analyzers adapted for serially performing different levels of analysis at successive different layers of analysis, where the packets analyzed at a given level of analysis is forwarded to a next successive layer for additional analysis, and the additional analysis performed at the next layer profits from the analysis performed by the previous given level of analysis.

And the invention also provides a method for analyzing traffic flow on a communication link where network information is provided over a data network received by a concentrator, and access points interface between the terminals and the concentrator for each of the terminals, where the method includes hosting embedded classification components in the access points to perform classification and analysis of the traffic flow, processing results of the classification sent by the embedded classification components using a management server, using the classified information pertaining to the classification of the traffic processed by the management server using at least one network operation system, and generating a comprehensive analysis of the traffic flow.

Other features of the invention are further recited in the dependent claims.

These and other aspects of the distributed traffic analysis system and method will be apparent from the following description, drawings, and from the claims.

DETAILED DESCRIPTION

Figure 1:
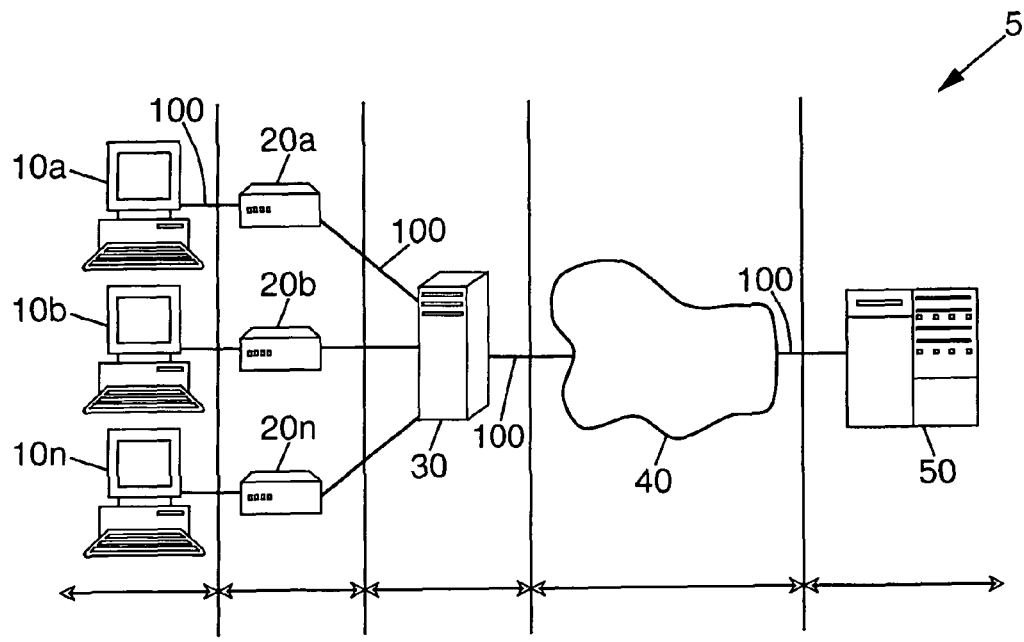
FIG. 1 is a schematic diagram of a communication system and its components.

Referring to FIG. 1, a communication system 5 includes a network server 50, which provides information pertaining to the traffic flow over a data network 40. Using a communication link 100, this information is received by a concentrator 30, which provides a bridge between the server 50 and end user terminals 10$a$-10$n$. The interface between the terminals 10$a$-10$n$ and the concentrator 30 is provided through a number of access points 20$a$-20$n$, each of which correspond to the terminals 10$a$-10$n$.

For purposes of FIG. 1, the communication system 5 may be that of any network structure such as DSL, or any other type such as cable, FTTH (Fiber to the Home or Fiber to the Premises) communication transmissions, mobile telephone networks (GSM, CDMA, UMTS, etc) and WiFi or WiMax networks. Further, communication link 100 may be any type of physical link as well as radio link.

Figure 2:
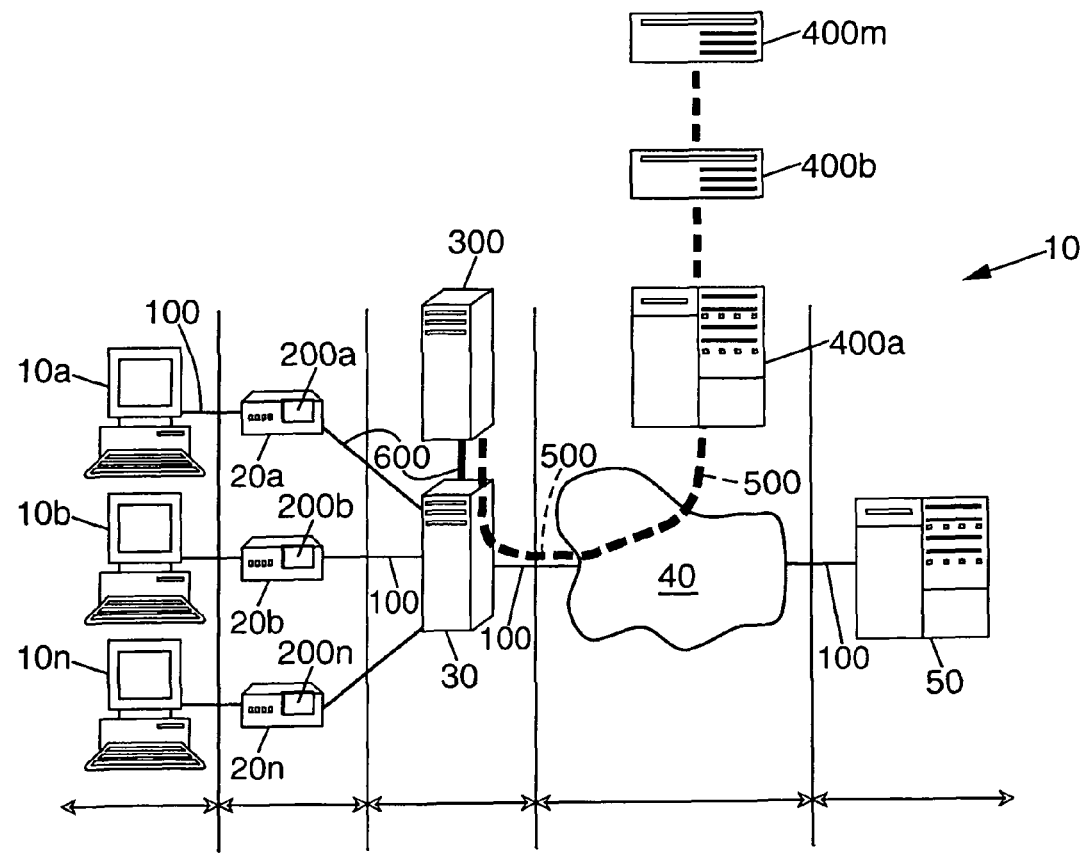
FIG. 2 is a schematic diagram of a distributed traffic analysis system added onto the communication chain of FIG. 1.

Referring now to FIG. 2, a distributed traffic analysis system 10 is added to the communication system 5 to perform packet classification and analysis. The distribution of the traffic analysis task is performed by embedding the functions of analyzing and classifying the traffic flow to/from the terminals 10$a$-10$n$ in the access points 20$a$-20$n$, as well as sending the results of the packet analysis and classification to a management server 300, which is coupled to the concentrator 30 configured to processes the results received from all the access points 20$a$-20$b$.

In other words, additional components or blocks of the distributed traffic analysis system 10 are implemented in the communication system 5 of FIG. 1 to provide traffic analysis on the communication link 100. In particular, the components of the of the distributed network system 10 include:

the management server 300, which processes classification data, for example, filtering, accounting, or statistics data;

embedded classification components 200$a$-200$n$ added to each of the access points 20$a$-20$n$; and one or several network operating systems 400$a$-400$n$, which use the data processed by the management server 300.

The embedded classification components 200$a$-200$n$ perform the analysis of the packets and its classification to/from the terminals 10$a$-10$n$. The embedded classification components also manage the means of communication with the management server 300 using a specific communication protocol 600.

The management server 300 receives the classified information from all the embedded classification components 200$a$-200$n$, and goes on to process them by applying a number of operations such as filtering, counting, billing, or computing vital network statistics. The management server 300 can also gather the data traffic classified by the type of traffic.

For example, as shown in FIG. 2, the network operating systems 400$a$-400$n$ can collect the log generated by the management server 300 to perform billing of the traffic on a usage basis, and provide valuable information about network users and applications, peak usage times, traffic routing, and the like.

The distributed traffic analysis system 10 can include a single network operating system 400$a$ or a number of network operating systems 400$a$-400$n$, which will collect the information processed by the management server 300 in order to compute the raw data into a comprehensive format. In particular, the network operating system 400$a$ could be a billing system that collects the volumetric information grouped by type of traffic on the management server 300. As mentioned, one or a plurality of network operating systems 400$a$-400$n$ can be implemented. Thus, the results of the information processed by the management server 300 can be handled by a single system or distributed over several systems, with each system performing a specific computation. This information can consist in vital network traffic information pertaining to the network traffic accounting, usage-based network billing, network planning, security, Denial of Service monitoring capabilities, Quality of Service, network monitoring and management, or statistical monitoring of the extensive data traffic carried through the communication link 100.

In other words, in the distributed traffic analysis system 10, the network operating systems 400$a$-400$m$ use the information provided by the management server 300 without changing the installed infrastructure.

Generally, when performing traffic analysis on the communication link 100, the traffic between the access points 20$a$-20$n$ and the concentrator 30 can be quite high (e.g., 10 Gbps) reaching as high as a couple dozen Gpbs in the core of an operator's network. Therefore, in heavily trafficked networks, the classification analysis of packets which can be performed at this point at wire speeds can be equally strained by the complexity of the packets to be analyzed, the increasing amount of new protocols used in packet communication networks, the number of protocol modifications and new dependency links, as well as packet encryption.

This problem can be alleviated by another level of analysis provided by the management server 300. In addition to processing the analyses performed by the embedded classification components 200a-200n, the management server 300 can also perform a hierarchical level of analysis which builds upon the initial analysis performed by the embedded classification components 200a-200n.

For example, to accurately analyze packets communicated within a data network, the packets of this network's traffic flow must be properly analyzed and classified. To accomplish this, the communication system 5 implements the distributed traffic analysis system 10 to aid in this effort. Not only should the embedded classification components 200a-200n be detected, classified and analyzed, but for each of these packets, the network components, namely, the components of the distributed traffic analysis system 10 must determine the protocol (e.g., HTTP, FTP, H.323, VPN, IPv4, IPv6), the application/use within the protocol (e.g., voice, video, data, real-time data, etc.) and an end user's patter of use within each application or the application context (e.g., options selected, services requested, services delivered, duration, time of day, data requested, etc.). This should globally ensure the means to measure and analyze the network activity objectively, to undertake real time analysis and to be notified of any network problems.

Because the analysis and classification of packets often involve the complex task of constructing protocol attributes, i.e., determining the ordered sequence of protocol names used in the semantic stream of data and the parameter names carried by a protocol, a first level of analysis can take place at the level of the embedded classification components of the access points 20a-20n with subsequent more detailed and complex levels of analysis at the management server 300.

Further, the communication mechanism between the embedded classification components 200a-200n and the management server 300 is managed by the embedded classification components 200a-200n themselves. For example, there can be several implementations for the communication mechanisms.

Figure 3:
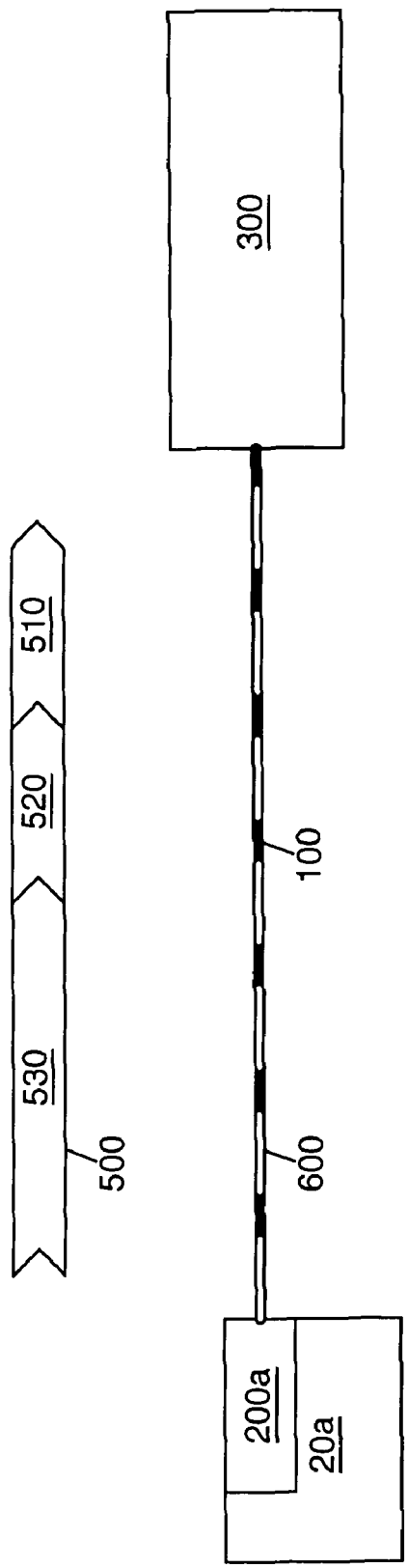
FIG. 3 is a schematic diagram of a communication protocol used in the system of FIG. 2.

Referring to FIGS. 2 and 3, the communication mechanism between the management server 300 and the embedded classification component 200a is performed using the communication protocol 600, which is based on a modification of data packets 500 of the communication link 100.

For example, in an IPv6 environment, an IP packet contains a block 520 flanked by blocks 510 and 530, which is dedicated for this purpose. When the traffic flow between the management server 300 and the access points 20a-20n is of the IP type, communication between the embedded classification components 200a-200n and the management server 300 can be done by including the communication information in the data block 520. As a result, the communication system 5 modifies the packets by using a tagging field available for this purpose. This approach can be directly implemented in an IPv6 environment, where a field of this type has been provisioned for this purpose and with sufficient size.

Other implementations can include communications using a proprietary signalling between the access points 20a-20n and the management server 300. A protocol can route the classification information associated with a method of traffic recognition, for example, using hash keys, from the access points 20a-20n toward the management server 300. The same protocol is capable to route commands, management information, and policy information from the management server 300 to the access points 20a-20n. Additionally, another implementation can use a standardized communication mechanism base on an existing standardized protocol like NetFlow, i.e., which provides a key set of services for IP applications, including network traffic accounting and various other types of data collection.

Moreover, another implementation can use a tunnel between the access points 20a-20n and the management server 300. This implementation has the advantage of certifying the validity of the processing performed on the access points 20a-20n. All data traffic not included in this tunnel is rejected by the management server 300. Oftentimes, when the tunnel is already present in the access points 20a-20n for other uses, complementary signalling to the existing tunnel is provided. In this case, the additional functions required on the access points 20a-20n are limited.

Finally, the distributed traffic analysis system 10 described above in FIG. 2 has been described using a particular network configuration, but it can be implemented on any type of architecture or network configuration. In other words, although the most common or popular transmission systems have been mentioned such as those found in DSL, cable, or FTTH transmission networks, the present system and method can also be easily adapted to support analysis of data transmission in telephony networks (2G, 2.5G, 3G) or wireless communication networks (WiFi, WiMax). Consequently, implementations on other types of networks are possible to provide a comprehensive solution for network planning, monitoring, billing, etc.

The invention claimed is:

1. A distributed traffic analysis system for analyzing traffic flow on a data packet network communication link comprising terminals, access points, a concentrator, and a data network, wherein the access points are provided as interfaces between the terminals and the concentrator for each of the terminals, wherein the distributed traffic analysis system comprises:
   a. embedded classification components hosted in at least some of the access points for performing classification and analysis of network traffic;
   b. a management server configured to process results of the classification sent by the embedded classification components; and
   c. at least one network operating system adapted to use the classified information pertaining to the classification of the traffic processed by the management server to generate a comprehensive analysis of the traffic,
   wherein the system further comprises a communication protocol managed by the embedded classification components for providing a communication means between the embedded classification components and the management server,
   said communication protocol being configured to encapsulate the information within the traffic flow by modifying the content of the packets intended to carry optional information.

2. The system according to claim 1, wherein the communication protocol is configured to use a proprietary signaling between the embedded classification components and the management server.

3. The system according to claim 1, wherein the communication protocol is configured to use a standardized signaling between the embedded classification components and the management server.

4. The system according to claim 1, wherein the communication protocol is configured to generate a tunnel between the embedded classification components and the management server.

5. The system of claim 1, wherein the management server is configured to process the classified information pertaining to the classification of the traffic flow by consolidating and storing the classified traffic.

6. The system of claim 1, wherein the management server is configured to process the classified information pertaining to the classification of the traffic flow by counting the classified traffic.

7. The system of claim 1, wherein the management server is configured to process the classified information pertaining to the classification of the traffic flow by establishing statistical information.

8. The system of claim 1, wherein the comprehensive analysis of the traffic flow is used by a billing service.

9. The system of claim 1, wherein the system further comprises a hierarchical analyzing system comprising analyzers adapted for serially performing different levels of analysis at successive different layers of analysis, wherein the packets analyzed at a given level of analysis are forwarded to a next successive layer for additional analysis, and the additional analysis performed at the next layer profits from the analysis performed by the previous given level of analysis.

10. A method for analyzing traffic flow on a network communication link wherein network information is provided over a data network received by a concentrator, and wherein access points are provided as interfaces between the terminals and the concentrator for each of the terminals, wherein the method comprises:
hosting embedded classification components in the access points to perform classification and analysis of the traffic flow;
processing results of the classification sent by the embedded classification components using a management server;
using the classified information pertaining to the classification of the traffic processed by the management server using at least one network operation system; and
generating a comprehensive analysis of the traffic flow,
wherein the method further comprises providing a communication means between the embedded classification components and the management server via a communication protocol managed by the embedded classification components, and said communication protocol encapsulates the information within the traffic flow comprised of packets, and modifies the content of the packets intended to carry optional information.

11. The method according to claim 10, wherein the communication protocol uses a proprietary signaling between the embedded classification components and the management server.

12. The method according to claim 10, wherein the communication protocol uses a standardized signaling between the embedded classification components and the management server.

13. The method according to claim 10, wherein the communication protocol generates a tunnel between the embedded classification components and the management server.

14. The method of claim 10, wherein the management server processes the classified information pertaining to the classification of the traffic flow by filtering the classified traffic.

15. The method of claim 10, wherein the management server processes the classified information pertaining to the classification of the traffic flow by counting the classified traffic.

16. The method of claim 10, wherein the management server processes the classified information pertaining to the classification of the traffic flow by establishing statistical information.

17. The method of claim 10, wherein generating the comprehensive analysis of the traffic flow is used by a billing service.

* * * * *